United States Patent
Varon et al.

(10) Patent No.: US 10,856,145 B2
(45) Date of Patent: Dec. 1, 2020

(54) METHOD AND DEVICE FOR IDENTIFYING VISITED AND HOME AUTHENTICATION SERVERS

(71) Applicant: Orange, Paris (FR)

(72) Inventors: Marc Varon, Rennes (FR); Lionel Morand, Malakoff (FR); Julien Bournelle, Paris (FR)

(73) Assignee: ORANGE, Paris (FR)

( * ) Notice: Subject to any disclaimer, the term of this patent is extended or adjusted under 35 U.S.C. 154(b) by 26 days.

(21) Appl. No.: 15/750,374

(22) PCT Filed: Aug. 2, 2016

(86) PCT No.: PCT/FR2016/052007
§ 371 (c)(1),
(2) Date: Feb. 5, 2018

(87) PCT Pub. No.: WO2017/021648
PCT Pub. Date: Feb. 9, 2017

(65) Prior Publication Data
US 2018/0227758 A1 Aug. 9, 2018

(30) Foreign Application Priority Data

Aug. 5, 2015 (FR) ...................................... 15 57562

(51) Int. Cl.
*H04W 12/06* (2009.01)
*H04L 29/06* (2006.01)

(52) U.S. Cl.
CPC ......... *H04W 12/06* (2013.01); *H04L 63/0884* (2013.01)

(58) Field of Classification Search
CPC ........................... H04W 12/06; H04L 63/0884
See application file for complete search history.

(56) References Cited

U.S. PATENT DOCUMENTS

| | | | |
|---|---|---|---|
| 7,716,723 B1* | 5/2010 | Taylor | ..................... H04L 63/08 380/273 |
| 2003/0090998 A1* | 5/2003 | Lee | ..................... H04L 63/0272 370/229 |

(Continued)

FOREIGN PATENT DOCUMENTS

| | | |
|---|---|---|
| CN | 102638473 A | 8/2012 |
| EP | 1693995 A1 | 8/2006 |
| EP | 2445242 A1 | 4/2012 |
| EP | 2741530 A1 | 6/2014 |

OTHER PUBLICATIONS

Tuladhar et al., Inter-Domain Authentication for Seamless Roaming in Heterogeneous Wireless Networks, Jun. 2008, IEEE International Conference on Sensor Networks, Ubiquitous, and Trustworthy Computing, pp. 249-255 (Year: 2008).*

(Continued)

*Primary Examiner* — Kenneth W Chang
(74) *Attorney, Agent, or Firm* — David D. Brush; Westman, Champlin & Koehler, P.A.

(57) ABSTRACT

Authentication problems often occur when a user of a terminal visits a communications network while roaming. A method is therefore provided for authorizing an authenticated user of a communications terminal. The terminal is configured to connect to a packet-switching network via an access gateway over a current network to which the terminal is connected. The method is implemented by a current authentication server over the current network and includes: receipt of a user authorization request from the access gateway, including an identifier of the user; transmission of a user authorization response to the access gateway, including parameters for authorizing the user, and a unique identifier of an authentication server that authenticated the user.

9 Claims, 4 Drawing Sheets

(56) References Cited

U.S. PATENT DOCUMENTS

| | | | |
|---|---|---|---|
| 2004/0090937 A1* | 5/2004 | Chaskar | H04W 36/0011 370/331 |
| 2006/0019635 A1* | 1/2006 | Ollila | H04L 63/08 455/411 |
| 2007/0127495 A1* | 6/2007 | de Gregorio | H04W 8/06 370/395.52 |
| 2008/0117884 A1* | 5/2008 | Ishii | H04W 12/06 370/338 |
| 2008/0287102 A1* | 11/2008 | Suh | H04L 63/06 455/411 |
| 2009/0240941 A1* | 9/2009 | Lee | H04L 12/66 713/169 |
| 2010/0035578 A1 | 2/2010 | Ahmed | |
| 2010/0199332 A1* | 8/2010 | Bachmann | H04L 63/0471 726/4 |
| 2011/0093919 A1* | 4/2011 | Naslund | H04L 63/20 726/3 |
| 2011/0113250 A1* | 5/2011 | Li | H04L 47/2491 713/171 |
| 2012/0096529 A1 | 4/2012 | Bournelle et al. | |
| 2012/0210392 A1 | 8/2012 | Zhou et al. | |
| 2012/0322412 A1 | 12/2012 | Qiang | |
| 2013/0005332 A1 | 1/2013 | Sedlacek | |
| 2013/0115919 A1* | 5/2013 | Xu | H04L 61/6054 455/411 |
| 2013/0121322 A1 | 5/2013 | Salkintzis | |
| 2014/0157395 A1 | 6/2014 | Li et al. | |
| 2014/0245403 A1* | 8/2014 | Li | H04L 12/66 726/4 |
| 2014/0341203 A1 | 11/2014 | Liu et al. | |
| 2015/0020168 A1 | 1/2015 | Faccin et al. | |
| 2015/0063126 A1 | 3/2015 | Korhonen et al. | |
| 2015/0092701 A1 | 4/2015 | Horn et al. | |
| 2015/0244722 A1 | 8/2015 | Sedlacek et al. | |
| 2016/0119347 A1 | 4/2016 | Liu et al. | |
| 2018/0027414 A1 | 1/2018 | Li et al. | |
| 2018/0145982 A1 | 5/2018 | Wang et al. | |
| 2018/0227758 A1 | 8/2018 | Veron et al. | |

OTHER PUBLICATIONS

International Search Report dated Oct. 12, 2016 for corresponding International Application No. PCT/FR2016/052008, filed Aug. 2, 2016.
Written Opinion of the International Searching Authority dated Oct. 12, 2016 for corresponding International Application No. PCT/FR2016/052008, filed Aug. 2, 2016.
International Search Report dated Sep. 30, 2016 for corresponding International Application No. PCT/FR2016/052007, filed Aug. 2, 2016.
Written Opinion of the International Searching Authority dated Sep. 30, 2016 for corresponding International Application No. PCT/FR2016/052007, filed Aug. 2, 2016.
Reaz Ahmed et al., "Resource and Service Discovery in Large-Scale Milti-Domain Networks", IEEE Communications Surveys and Tutorials, Institut of Electrical and Electronics Engineers, US, vol. 9, No. 4, Oct. 1, 2007 (Oct. 1, 2007), pp. 2-30, XP011383440.
3rd Generation Partnership Project; Technical Specification Group Core Network and Terminals; Evolved Packet System (EPS); 3GPP EPS AAA interfaces (Release 13), 3GPP Standard; 3GPP TS 29.273, 3rd Generation Partnership Project (3GPP), Mobile Competence Centre; 650, Route Des Lucioles; F-06921 Sophia-Antipolis Cedex; France, vol. CT WG4, No. V13.0.0, Jun. 24, 2015 (Jun. 24, 2015), pp. 1-162, XP050966143.
Calhoun et al., "Diameter Base Protocol", RFS 3588, dated Sep. 2003.
3GPP TS 23.402, "3rd Generation Partnership Project; Technical Specification Group Services and System Aspects; Architecture enhancements for non-3GPP accesses (Release 13)", Jun. 2015.
English translation of the Written Opinion of the International Searching Authority dated Oct. 12, 2016 for corresponding International Application No. PCT/FR2016/052008, filed Aug. 2, 2016.
English translation of the Written Opinion of the International Searching Authority dated Sep. 30, 2016 for corresponding International Application No. PCT/FR2016/052007, filed Aug. 2, 2016.
Office Action dated Sep. 20, 2019 for corresponding U.S. Appl. No. 15/750,361, filed Feb. 5, 2018.
R. Rajavelsamy, Sungho Choi, "Security Aspects of INter-Access System Mobility Between 3GPP and non-3GPP Networks", Jan. 6-10, 2008, IEEE, INSPEC#10072045, Year 2008.
Omar Arafat, Mark A. Gregoryy, M.M. A. Khan, "Interworking Architecture Between 3GPP IMS, Mobile IP and WiMAX in OPNET", Dec. 9-10, 2014, IEEE, INSPEC#15293070, Year 2014.
Office Action dated Jun. 24, 2020 for corresponding U.S. Appl. No. 15/750,361, filed Feb. 5, 2018.
Final Office Action dated Mar. 13, 2020 for corresponding U.S. Appl. No. 15/750,361, filed Feb. 5, 2018.
Final Office Action dated Oct. 5, 2020 for corresponding U.S. Appl. No. 15/750,361, filed Oct. 5, 2020.

* cited by examiner

METHOD AND DEVICE FOR IDENTIFYING VISITED AND HOME AUTHENTICATION SERVERS

1. CROSS-REFERENCE TO RELATED APPLICATIONS

This Application is a Section 371 National Stage Application of International Application No. PCT/FR2016/052007, filed Aug. 2, 2016, the content of which is incorporated herein by reference in its entirety, and published as WO 2017/021648 on Feb. 9, 2017, not in English.

2. FIELD OF THE INVENTION

The invention lies in the field of IP access networks, and more particularly in the field of the mobility of terminals between IP access networks belonging and not belonging to the 3GPP mobile world.

3. PRIOR ART

In so-called non-3GPP access networks, for example WiFi access networks, if a terminal UE wishes to access the same services as when it is in a 3GPP access network, it must attach itself to an access gateway of this non-3GPP access network. This access gateway asks an authentication server, also called an AAA server, to authenticate the terminal UE on the basis of an identifier of the user of the terminal UE. The AAA server contacts a so-called HSS (Home Subscriber Server) server to recover the information necessary for the authentication of the user of the terminal UE and transmit said information to the access gateway which transmits it in its turn to the terminal UE so that it can authenticate itself. Once the response of the user of the terminal UE to the authentication request has been received, the latter is transmitted to the AAA server for verification. Once the authentication of the user of the terminal UE is successful, the AAA server registers with the HSS server to indicate that it is handling the access session of the terminal UE and to recover the information making it possible to know the rights of access to the service from which the user benefits. The authentication server, in addition to authenticating the user and authorizing the attachment of her/his terminal to the access gateway, can also indicate to the access gateway what item of equipment it must attach itself to in order to allow the terminal access to a packet network such as the Internet or IMS. This item of equipment is called an anchor gateway, also called PDN Gateway, or PGW.

If the identity of the anchor gateway PGW is not provided by the authentication server in the authentication response returned to the access gateway, it is up to the access gateway to discover the identity of the PGW, this discovery being able to be done on the basis of information configured statically in the access gateway (FQDN addresses or IP addresses of the anchor gateways PGW to be contacted) or via information returned by a DNS (Domain Name Server) server interrogated by the access gateway.

When the access gateway asks the anchor gateway for the establishment of a connection in respect of the user of the terminal UE identified by its identifier, the anchor gateway must register with the authentication server. The anchor gateway therefore dispatches a registration request to a default authentication server, which is not always the same one as the one used to authenticate the terminal for the access gateway, by indicating the opening of a connection for the user of the terminal UE identified by its identifier.

The authentication server contacted by the anchor gateway dispatches a registration request in respect of the user of the terminal UE, to the HSS server, which knows the users and the authentication servers on which they depend. If the user of the terminal UE, identified by the identifier contained in the request, has not been handled by this authentication server but by another, the HSS server returns the identity of this other server in the response to the request dispatched by the authentication server contacted by the anchor gateway. In this case, the authentication server returns a redirection indication in response to the registration request of the anchor gateway, this response containing the authentication server's identity transmitted by the HSS server. The anchor gateway can then re-send a registration request to the authentication server handling the access session for this user, by using the server identity received in the redirection indication.

When the terminal is roaming in a visited network, this network can be authorized by the user's home network to allocate one of its anchor gateways rather than using an anchor gateway in the home network. The anchor gateway must then, as explained hereinabove, register with the authentication server that authenticated the user in the home network, but it must moreover do so by routing the request thereof through an authentication server of its own network, among other things for tracking and accounting reasons, or for the application of a specific policy of the visited network. This authentication server of the visited network must in general be the one to which the access gateway initially addressed itself in order to authenticate the user, since the access gateway is also in the visited network. The anchor gateway does not know this authentication server and must discover it separately through specific signaling.

This specific signaling occurs ever more frequently, because of the multiplicity of operators, terminals, of their mobility between different operator domains, of their mobility between 3GPP domains and non-3GPP domains, and of the increase in the number of authentication servers in a given domain.

This causes a substantial increase in the signaling between anchor gateways, authentication servers and HSS servers, which might give rise to slowdowns and malfunctions of the networks.

One of the aims of the invention is to remedy these drawbacks of the prior art.

4. SUMMARY

The invention improves the situation with the aid of a method for authorizing an authenticated user of a communications terminal, the terminal being intended to connect to a packet switching network via an access gateway to which the terminal is attached in a current network, the method being implemented by a current authentication server in the current network and comprising the following steps:

reception of a user authorization request originating from the access gateway, comprising an identifier of the user, sending of a user authorization response destined for the access gateway, comprising authorization parameters in respect of the user, the user authorization response furthermore comprising a unique identifier of an authentication server that authenticated the user.

Once the user has been authenticated, for example by an attachment procedure, the access gateway asks for an authorization for the user and the type of packet switching network that he wishes to access, identified by a so-called APN (Access Point Name) parameter, such as for example an IMS network.

Once the user has been authorized, the access gateway can ask for the establishment of a connection between the user's terminal and a so-called anchor gateway which is connected to the packet switching network.

By virtue of the method of authorization according to the invention, in contradistinction to the earlier technique, the access gateway is able to indicate to the anchor gateway the authentication server with which it must register, which must be the authentication server which has been used to authenticate the user. Indeed according to the invention the unique identifier of this authentication server is included in the authentication response.

In a first case, the terminal of the user is not in a roaming situation, but several authentication servers may exist, deployed in the network thereof, and the authentication server contacted by the access gateway, which performs the authorization, is not necessarily the same as that which the anchor gateway would contact by default.

In a second case, the terminal is in a roaming situation in a visited access network which is not its usual access network (i.e. which is not its "home network"), the current authentication server allotted to the access gateway is an authentication server bound to the visited access network, and the authorization request must then be redirected by the current authentication server to the authentication server of the usual network.

In either case, the current authentication server recovers the identifier of the authentication server which authenticated the user, which may be its own or that of another server, according to case, and communicates it in its response to the access gateway. Thus, the access gateway knows this identifier, in contradistinction to the earlier technique where the access gateway can deduce this identifier only for the current authorization server, which is not necessarily the correct one.

The access gateway can therefore indicate this identifier to the anchor gateway which is allotted to it for this user terminal, thereby avoiding the situation in which the latter gateway addresses itself to another authentication server in order to register and causes a redirection of the registration to an HSS server, waits for an identifier of a correct authentication server, and then recommences the registration.

The protocols in use for 3GPP do not make provision to include the identifier of the correct authentication server in the authorization response, since either the access gateway has addressed itself to the correct server in which case it is presumed to know its identifier, or the access gateway does not know the correct server since the terminal is in a roaming situation and redirection mechanisms are provided for in that case. Moreover, the protocols in use for 3GPP do not distinguish among several authentication servers for one and the same operator network. The solution according to the invention, which is to include the identifier of the correct authentication server in the authentication response to the access gateway, therefore runs counter to the prejudices of the person skilled in the art.

The identifier of the correct authentication server is unique, in the sense that it allows the anchor gateway to address a request directly thereto, without passing through a third-party item of equipment to obtain an address supplement, such as for example a DNS server. This may be an identifier making it possible to uniquely distinguish the authentication server, or this may be an identifier of a unique connection to this server.

The unique identifier may for example take one of the following formats:
an IP address, perhaps combined with a port number if several are present at this IP address,
a network name of FQDN (Fully Qualified Domain Name) type; in the DNS, an FQDN is a domain name which reveals the absolute position of a node in the DNS tree by indicating all the domains of higher level up to the root,
a Diameter identity, perhaps combined with a Diameter domain name; Diameter is an authentication protocol defined by RFC 3588, the successor of the RADIUS protocol.

According to one aspect of the invention, the user has been authenticated by the current authentication server.

By virtue of this aspect, the access gateway receives the correct identifier when the current authentication server is the one that authenticated the user, this being the case when the terminal is not in a situation of roaming or far away from its usual network, and when the authentication server that the access gateway knows by default coincides with the one which is able to authorize the user.

According to one aspect of the invention, the user has been authenticated by another authentication server, the user authorization request received being transmitted to this other authentication server.

By virtue of this aspect, the access gateway receives the correct identifier even when the current authentication server is not the one that authenticated the user. This is the case when the terminal is in a roaming situation, or more generally, without there necessarily being any roaming between two operators, one being "visited" and the other "home", when the current network is a local network visited by the user which is not the remote network (relative to the current or local network) to which he usually connects.

It is assumed in this mode that the authentication server that the access gateway knows by default, even if it is not the one which is able to authorize the user, is able to redirect the authentication request to the authentication server of the user's usual network.

Hereinafter in the document, "visited network" and "local network" have the same meaning. Similarly, "home network", "usual network" and "remote network" have the same meaning.

In this mode corresponding to the second case presented above, the current network is the visited network, whilst in a mode corresponding to the first case presented above, there is no distinction between visited network and home network, and therefore just a single network, also called the current network.

According to one aspect of the invention, the current authentication server is in a so-called visited network which is visited by the terminal and the other authentication server that authenticated the user is in a so-called home network of the terminal, the method of authorization furthermore comprises a step of obtaining an item of information relating to an authorization to allocate a so-called anchor gateway situated in the visited network and intended to connect the user terminal to the packet switching network, and the user authorization response also comprises a unique address of the current authentication server.

In certain cases, the current network, that is to say the visited network, may be authorized by the user's home network to allocate one of its anchor gateways rather than using an anchor gateway in the home network. This authorization can be included in a response received by the current authentication server, subsequent to the transmission of the user authorization request to the other authentication server.

The anchor gateway must then, as previously, register with the authentication server that authenticated the user in the home network, but it must moreover do so by routing the request thereof through the authentication server of its own network, among other things for tracking and accounting reasons, or for the application of a specific policy of the visited network.

By virtue of this aspect, the access gateway receives not only the correct address of the authentication server that authenticated the user but also that of the authentication server through which it must necessarily route its registration request. This avoids the additional signalings which would be due to the redirection of the registration request by an authentication server associated by default with the anchor gateway, so that it is correctly routed.

The invention also relates to a method for connecting a terminal of a user to an anchor gateway connected to a packet switching network, the method being implemented by an access gateway to which the terminal is attached and comprising the following steps:
  sending of a user authorization request comprising an identifier of the user, destined for a current authentication server,
  reception of a user authorization response originating from the current authentication server,
  sending of a connection request to the anchor gateway, intended to connect the terminal to the packet switching network,
the user authorization response received comprising a unique identifier of an authentication server that authenticated the user, this identifier being included in the connection request sent.

By virtue of the method of connection according to the invention, in contradistinction to the earlier technique, the anchor gateway is able to register with the authentication server which has been used to authenticate the user, since its identifier is included in the connection request sent by the access gateway to the anchor gateway.

The anchor gateway therefore avoids addressing itself to a default authentication server in order to register, which is not the correct one, and avoids causing a redirection of the registration to an HSS server, waiting for an identifier of the correct authentication server, and then recommencing the registration.

The protocols in use for 3GPP do not make provision to include the identifier of the correct authentication server in the connection request, since either the terminal is not in a roaming situation and the anchor gateway addresses itself to its default server, in which case it is presumed to know its identifier, or the terminal is in a roaming situation and the anchor gateway does not know the correct authentication server and redirection mechanisms are provided for in that case. The solution according to the invention, which is to include the identifier of the correct authentication server in the connection request to the anchor gateway therefore runs counter to the prejudices of the person skilled in the art.

The current authentication server can be the one which authenticates the user. In this first case, presented above, the identifier included in the authorization response and in the connection request is that of the current authentication server.

The current authentication server can be in the visited network and the server which authorizes the user can be in the home network. This is the second case presented above, where for example the terminal is roaming. In this case the identifier included in the authorization response and in the connection request is that of another authentication server, situated in the home network, and not in the visited network.

According to one aspect of the invention, the user authorization response received furthermore comprises a unique identifier of the current authentication server, and this identifier is also included in the connection request sent.

As explained above, in certain cases, the current network, that is to say the visited network, can be authorized by the user's home network to allocate one of its anchor gateways rather than using an anchor gateway in the home network. The anchor gateway must then, as previously, register with the authentication server that authenticated the user in the home network, but it must moreover do so by routing its registration request through the authentication server of its own network, for the reasons mentioned above.

By virtue of this aspect, the anchor gateway receives from the access gateway not only the correct identifier of the authentication server that authenticated the user but also that of the authentication server through which it must necessarily route its registration request.

According to one aspect of the invention, the user authorization response received furthermore comprises a unique identifier of the current authentication server, and an authorization parameter relating to the selection of an anchor gateway in a network visited by the terminal, reception of which triggers a step of selecting between an anchor gateway in a network visited by the terminal or an anchor gateway in a home network of the terminal, the current authentication server being in the visited network and the authentication server that authenticated the user being in the home network.

When the access gateway receives the identifiers of two different authentication servers, and when moreover it has received the authorization to select an anchor gateway in the visited network, it can then decide to do so or not. If it decides to select an anchor gateway in the visited network, with the aid of a known procedure such as a DNS request whose response can depend on the APN requested by the user, the access gateway knows that the anchor gateway will be able to receive from it not only the correct identifier of the authentication server that authenticated the user, but also that of the authentication server through which it must necessarily route its registration request.

According to one aspect of the invention, the connection request sent furthermore comprises the unique identifier of the current authentication server, if the anchor gateway is selected in the visited network.

By virtue of this aspect, the anchor gateway in the visited network is able to route its registration request through the authentication server of its own network.

The invention also relates to a method of registration of an anchor gateway intended to connect a terminal of a user to a packet switching network, comprising the following steps:
  reception of a connection request in respect of the terminal, originating from an access gateway to which the terminal is attached,
  sending of a registration request to an authentication server that previously authenticated the user,
the connection request received comprising a unique identifier of the authentication server that previously authenticated the user.

By virtue of the method of registration according to the invention, in contradistinction to the earlier technique, the anchor gateway is able to register immediately with the authentication server which has been used to authenticate the user, since its identifier is included in the connection request received from the access gateway by the anchor gateway.

According to one aspect of the invention, the access gateway and the anchor gateway are in a network visited by the terminal, and the connection request received furthermore comprises a unique identifier of another authentication server in the visited network, through which the registration request sent is routed.

If the connection is established according to the previously described method of connection according to the invention, the authentication server of the visited network is the first authentication server contacted by the access gateway during a prior phase of authentication and of authorization of the user.

By virtue of this aspect, the anchor gateway, when it is selected in the visited network, is able to route its registration request through the correct authentication server in its own network.

According to one aspect of the invention, an authentication server identifier uses a format from among the following:
    an IP address, perhaps combined with a port number if several ports are present at this IP address,
    a network name of FQDN type.

Advantageously, these identifier formats, in contradistinction to an identifier of Diameter type which necessarily designates the final destination item of equipment of a Diameter exchange, can designate an intermediate, or "spliced-in", item of equipment through which a message can therefore be routed before reaching its final destination.

The invention also relates to a device for authorizing an authenticated user of a communications terminal, the terminal being intended to connect to a packet switching network via an access gateway to which the terminal is attached in a current network, the device being implemented by a current authentication server in the current network and comprising the following modules:
    reception of a user authorization request originating from the access gateway, comprising an identifier of the user,
    sending of a user authorization response destined for the access gateway, comprising authorization parameters in respect of the user, and a unique identifier of an authentication server that authenticated the user,
    if the current authentication server is in a so-called visited network which is visited by the terminal, and if the user has been authenticated by another authentication server in a so-called home network of the terminal, a module for transmitting the authorization request to the other authentication server, a module for obtaining an item of information relating to an authorization to allocate a so-called anchor gateway situated in the visited network and intended to connect the user terminal to the packet switching network, and a module for including in the user authorization response a unique address of the current authentication server.

This device is able to implement in all its embodiments the method of authorization which has just been described.

The invention also relates to a device for connecting a terminal of a user to an anchor gateway connected to a packet switching network, the device being implemented by an access gateway to which the terminal is attached and comprising the following modules:
    sending of a user authorization request comprising an identifier of the user, destined for a current authentication server,
    reception of a user authorization response originating from the current authentication server, comprising a unique identifier of an authentication server that authenticated the user,
    sending of a connection request to the anchor gateway, intended to connect the terminal to the packet switching network, comprising the unique identifier of the authentication server that authenticated the user.

This device is able to implement in all its embodiments the method of connection which has just been described.

The invention also relates to a device for registering an anchor gateway intended to connect a terminal of a user to a packet switching network, comprising the following modules:
    reception of a connection request in respect of the terminal, originating from an access gateway to which the terminal is attached, comprising a unique identifier of the authentication server that previously authenticated the user,
    sending of a registration request to the authentication server that previously authenticated the user.

This device is able to implement in all its embodiments the method of registration which has just been described.

The invention also relates to a system for identifying authentication servers comprising an authorization device, a connection device and a registration device such as those which have just been described.

By virtue of this identification system, an anchor server always obtains the identifier of the correct authentication server or servers with which it must register when it receives a connection request on the part of an access gateway for a user terminal, even if this terminal is in a roaming situation in a visited network, whether the access gateway is in the visited network or in the user's home network. In contradistinction to the earlier technique, it is not necessary that the anchor gateway itself discovers this or these identifiers by specific signaling.

The invention also relates to a computer program comprising instructions for the implementation of the steps of the method of authorization which has just been described, when this program is executed by a processor.

The invention also relates to a computer program comprising instructions for the implementation of the steps of the method of connection which has just been described, when this program is executed by a processor.

The invention also relates to a computer program comprising instructions for the implementation of the steps of the method of registration which has just been described, when this program is executed by a processor.

These programs can use any programming language, and be in the form of source code, object code, or of code intermediate between source code and object code, such as in a partially compiled form, or in any other desirable form.

The invention also envisages, for each of the computer programs mentioned hereinabove, an information medium readable by a computer, and comprising instructions of a respective computer program.

The information medium in question can be any entity or device capable of storing the program. For example, the medium can comprise a storage means, such as a ROM, for example a CD ROM or a microelectronic circuit ROM, or else a magnetic recording means, for example a diskette (floppy disk) or a hard disk.

Moreover, the information medium can be a transmissible medium such as an electrical or optical signal, which can be conveyed via an electrical or optical cable, by radio or by other means. The program according to the invention can be in particular downloaded from a network of Internet type.

Alternatively, the information medium can be an integrated circuit in which the program is incorporated, the circuit being adapted to execute or to be used in the execution of the methods in question.

The invention also relates to an alternative method for authorizing an authenticated user of a communications terminal, the terminal being intended to connect to a packet switching network via an access gateway to which the terminal is attached in a current network, the method being implemented by a current authentication server in the current network and comprising the following steps:

reception of a user authorization request originating from the access gateway, comprising an identifier of the user, sending of a user authorization response destined for the access gateway, comprising authorization parameters in respect of the user, the user authorization response furthermore comprising a unique identifier of the current authentication server.

In this alternative method and those which follow, the terminal is in a roaming situation in a visited network. In the visited network, according to one aspect of these alternative methods, the current authentication server can be replaced with a simple so-called "proxy" item of equipment, as long as it is spliced-in to the signaling between the access gateway in the visited network and the authentication server of the home network that authenticated the user.

The user authorization response comprises the identifier of the current authentication server (or of the proxy), which is not the one which authenticated the user. Indeed, it is sufficient that the access gateway knows only the identifier of the current authentication server (or of the proxy), since it is always possible for an anchor gateway to contact the authentication server of the home network that authenticated the user, with the aid of the user's identifier.

An advantage is to allow the current authentication server (or the proxy) of the visited network to be spliced-in to the entire signaling relating to one and the same user between the visited network, that is to say the access gateway or the anchor gateway, and the home network, that is to say the authentication server which authenticated the user.

The alternative method of authorization which has just been described collaborates with the alternative methods of connection and of registration which are described hereinbelow, so as to procure this advantage.

The invention also relates to an alternative method for connecting a terminal of a user to an anchor gateway connected to a packet switching network, the method being implemented by an access gateway to which the terminal is attached and comprising the following steps:

sending of a user authorization request comprising an identifier of the user, destined for a current authentication server, reception of a user authorization response originating from the current authentication server, sending of a connection request to the anchor gateway, intended to connect the terminal to the packet switching network, the user authorization response received comprising a unique identifier of the current authentication server, this identifier being included in the connection request sent.

The user authorization response and the connection request comprise the identifier of the current authentication server (or of the proxy), even if it is not the one which authenticated the user.

The invention also relates to an alternative method of registration of an anchor gateway intended to connect a terminal of a user to a packet switching network, comprising the following steps:

reception of a connection request in respect of the terminal, originating from an access gateway to which the terminal is attached, sending of a registration request to an authentication server that previously authenticated the user, the connection request received comprising a unique identifier of a so-called current authentication server, to which the access gateway has previously sent a user authorization request.

The connection request comprises the identifier of the current authentication server (or of the proxy), even if it is not the one which authenticated the user.

5. PRESENTATION OF THE FIGURES

Other advantages and characteristics of the invention will become more clearly apparent on reading the following description of a particular embodiment of the invention, given by way of simple illustrative and nonlimiting example, and of the appended drawings, among which.

6. DETAILED DESCRIPTION OF AT LEAST ONE EMBODIMENT OF THE INVENTION

In the subsequent description, examples of several embodiments of the invention are presented, based on the network architecture such as described by the standard 3GPP TS 23.402 (Release 13), but the invention also applies to other networks of different architecture, such as virtual private networks of level 2 (or Layer 2 virtual private network, or L2VPN) or of level 3 (L3VPN), or any other network where it is possible to have two distinct authentication and authorization procedures, one upon access, one in the network core.

Figure 1:
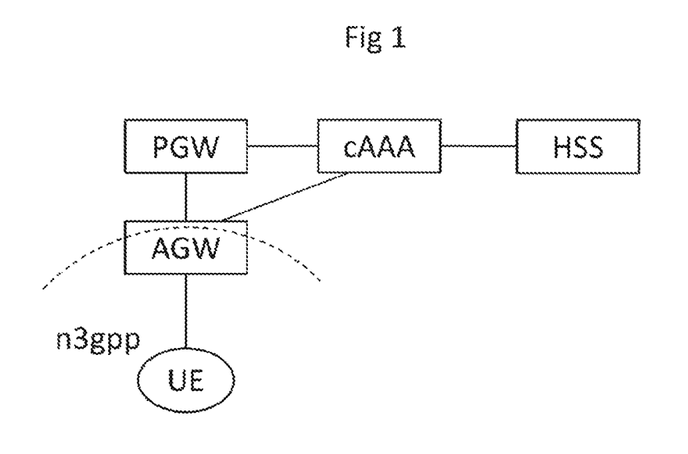
FIG. 1 presents in a schematic manner an overall view of the elements implementing the invention, according to a first embodiment.

FIG. 1 presents in a schematic manner an overall view of the elements implementing the invention, according to a first embodiment.

In this first embodiment, the user terminal UE is not in a roaming situation. The terminal UE is able to connect to an access gateway AGW offering non-3GPP access (denoted n3gpp in the figures) to the packet network core of a 3GPP network, or "3GPP world". The access gateway AGW is connected to one or more authentication servers of type AAA. In the case where there are several authentication servers, the server cAAA to be contacted for the terminal UE is either known in advance to the gateway AGW by configuration, or there exists a mechanism allowing dynamic discovery of the server cAAA as a function of the terminal UE and possibly as a function of the APN requested by the terminal.

After authentication and authorization of the terminal UE, the access gateway AGW can send a request to the anchor gateway PGW for the establishment of a connection for the terminal UE, the identifier making it possible to contact the anchor gateway PGW being either provided by the authentication server cAAA, or discovered dynamically by the access gateway AGW. During the establishment of this connection, the anchor gateway PGW registers with the authentication server cAAA by virtue of the methods of authorization, of connection and of registration according to the invention, where the identifier of the server cAAA is provided, in cascade, from the server cAAA, to the gateway AGW, to the gateway PGW.

Figure 2:
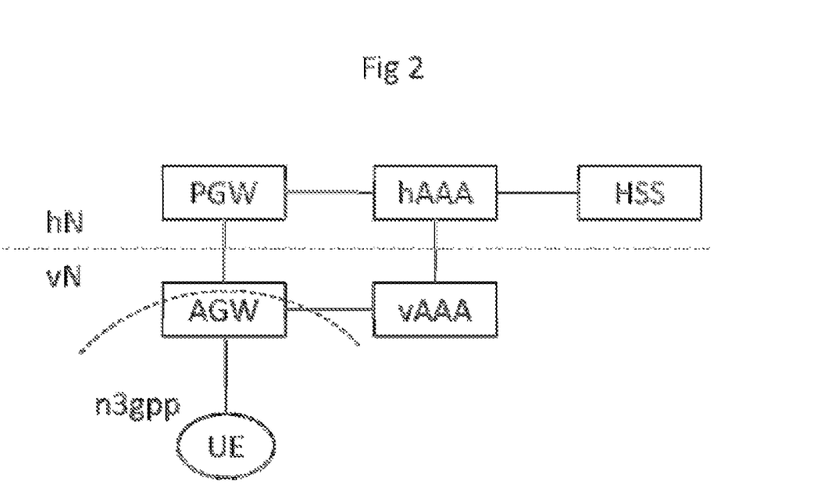
FIG. 2 presents in a schematic manner an overall view of the elements implementing the invention, according to a second embodiment.

FIG. 2 presents in a schematic manner an overall view of the elements implementing the invention, according to a second embodiment.

In this second embodiment, the user terminal UE is in a roaming situation and its anchor gateway PGW must be in the 3GPP home network, denoted hN.

The terminal UE is able to connect to an access gateway AGW offering non-3GPP access to the 3GPP world. The access gateway AGW is connected to one or more authentication servers of type AAA in charge of managing the requests for connection to the access gateways AGW situated in the visited 3GPP network, vN. In this mode, the authentication server vAAA to be contacted so as to authorize the connections of the terminals UE roaming in the visited network vN is either known in advance to the gateway AGW by configuration or discovered dynamically.

During authentication of the roaming terminal UE, the authentication server vAAA invoked by the access gateway AGW does not know the user of the terminal UE and must therefore address itself to the authentication server hAAA which can perform the authentication of the terminal UE. The routing of the request between the visited network vN of the authentication server vAAA and the home network hN of the authentication server hAAA is performed on the basis of the domain name contained in the identifier of the user of the terminal UE or by an alternative scheme making it possible to discover the domain name on the basis of this identifier (for example a lookup table), identifying in the present case the home network hN, and then the request is transmitted to one of the authentication servers hAAA deployed in the home network hN. The authentication server hAAA contacts the HSS in the home network hN to recover the information necessary for authentication and authorization of access of the terminal UE in the visited network vN.

The authentication server vAAA can also receive from the authentication server hAAA the identifier of the anchor gateway PGW which is in the home network hN. If it is not provided, the authentication server vAAA receives from the authentication server hAAA an item of information indicating that the anchor gateway PGW must be allocated in the home network hN. The identifier of the anchor gateway PGW to be contacted in the home network hN is discovered dynamically by the access gateway AGW. The authentication server hAAA response, relayed by the authentication server vAAA, and received by the access gateway AGW, allows the latter to discover the identifier of the authentication server hAAA in charge of the access session for the terminal UE while roaming.

The access gateway AGW can thus send a request to the anchor gateway PGW for a connection for the terminal UE. During the establishment of this connection, the anchor gateway PGW registers with the authentication server hAAA by virtue of the methods of authorization, of connection and of registration according to the invention, where the identifier of the authentication server hAAA is provided, in cascade, from the server hAAA, to the server vAAA, to the gateway AGW, to the gateway PGW.

Figure 3:
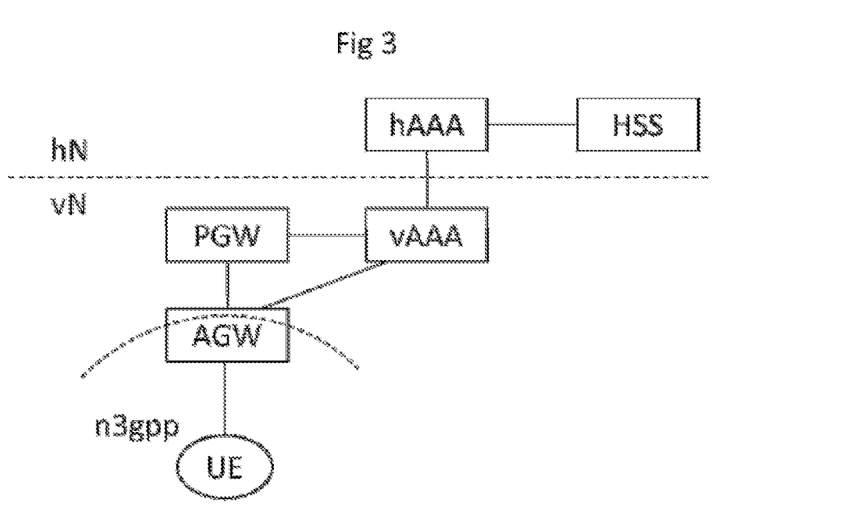
FIG. 3 presents in a schematic manner an overall view of the elements implementing the invention, according to a third embodiment.

FIG. 3 presents in a schematic manner an overall view of the elements implementing the invention, according to a third embodiment.

In this third embodiment, the user terminal UE is also in a roaming situation and its anchor gateway PGW can be in the visited 3GPP network, denoted vN.

The terminal UE is able to connect to an access gateway AGW offering non-3GPP access to the 3GPP world. The access gateway AGW is connected to one or more authentication servers of type AAA in charge of managing the requests for connection to the access gateways AGW situated in the visited network vN. In this mode, the server vAAA to be contacted so as to authorize the connections of the terminals UE roaming in the visited network vN is either known in advance to the gateway AGW by configuration or discovered dynamically.

During authentication of the roaming terminal UE, the authentication server vAAA invoked by the access gateway AGW does not know the user of the terminal UE and must therefore address itself to the authentication server hAAA which can perform the authentication of the terminal UE. The routing of the request between the visited network vN of the authentication server vAAA and the home network hN of the authentication server hAAA is performed on the basis of the domain name contained in the identifier of the user of the terminal UE or by an alternative scheme making it possible to discover the domain name on the basis of this identifier (for example a lookup table), identifying in the present case the home network hN, and then the request is transmitted to one of the authentication servers hAAA deployed in the home network hN. The authentication server hAAA contacts the HSS in the home network hN to recover the information necessary for authentication and authorization of access of the terminal UE in the visited network vN.

Unlike in the second embodiment, the authentication server vAAA does not receive from the authentication server hAAA the identifier of an anchor gateway PGW which is in the home network hN, but an item of information indicating that the anchor gateway PGW can be allocated in the visited network vN. The identifier of the anchor gateway PGW to be contacted in the visited network vN is discovered dynamically by the access gateway AGW. The authentication server hAAA response, relayed by the authentication server vAAA, and received by the access gateway AGW, allows the latter to discover the identifier of the authentication server hAAA in charge of the access session for the terminal UE while roaming.

The access gateway AGW can thus send a request to the anchor gateway PGW for a connection for the terminal UE. During the establishment of this connection, the anchor gateway PGW registers with the authentication server hAAA by passing through the authentication server vAAA, by virtue of the methods of authorization, of connection and of registration according to the invention, where the identifier of the authentication server hAAA is provided, in cascade, from the authentication server hAAA, to the authentication server vAAA, to the gateway AGW, to the gateway PGW, and where moreover, the identifier of the authentication server vAAA is provided, in cascade, from the authentication server vAAA, to the gateway AGW, to the gateway PGW.

The exchanges of messages between the various entities mentioned hereinabove are now detailed, for the three embodiments.

Figure 4:
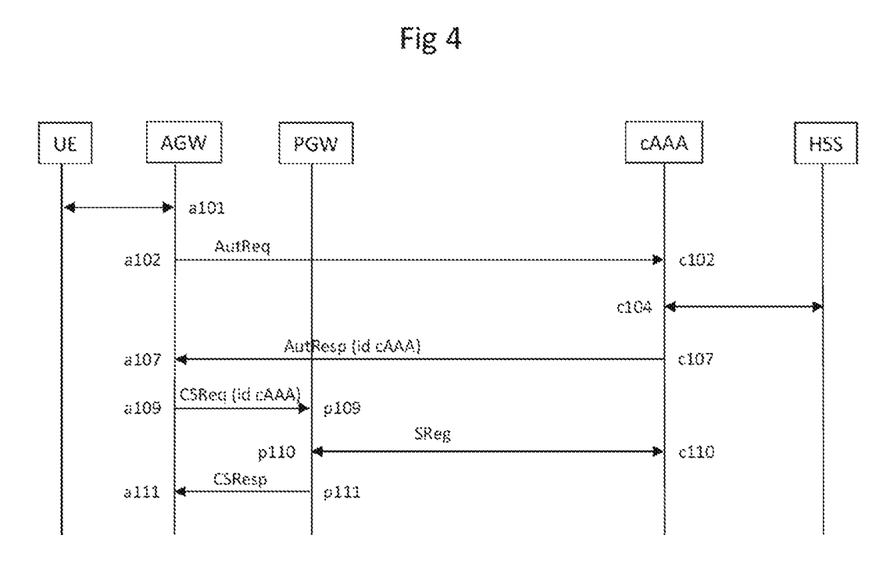
FIG. 4 presents the steps of the methods of authorization, of connection and of registration, according to the first embodiment of the invention.

FIG. 4 presents the steps of the methods of authorization, of connection and of registration, according to a first embodiment of the invention.

During a known step a101, the terminal UE of a user User attaches itself to the access gateway AGW, providing for example non-3GPP access, such as WiFi, to a service of a 3GPP network such as telephone voice. During this step the user User is authenticated by an authentication server.

During a known step a102, the access gateway AGW sends an authorization request AutReq in respect of the terminal UE, comprising an identifier UserId of the user User and the response to the authentication request dispatched by the terminal UE, to an authentication server cAAA of type AAA previously associated with the gateway AGW, which is the same server which dispatched the information necessary for the authentication of the user User during step a101.

During a known step c102, the authentication server cAAA receives the authorization request AutReq.

During a known step c104, the authentication server cAAA consults the HSS server associated therewith, and obtains the authorization parameters for the attachment of the terminal UE, which indicate in particular whether the anchor gateway PGW can be selected dynamically by the access gateway AGW and if so, whether this anchor gateway can be selected in a visited network or must be selected in the home network.

During a step c107, the authentication server cAAA sends an authorization response AutResp to the access gateway AGW, comprising its unique identifier, in addition to the information known according to the earlier technique. This unique identifier makes it possible to distinguish in a unique manner a server of type AAA, or a connection to the latter.

During a step a107, the access gateway AGW receives the authorization response AutResp.

During a step a109, the access gateway AGW sends a connection request CSReq in respect of the terminal UE to the anchor gateway PGW selected to allow the terminal access to the packet switching network requested by the user, with the aid of an identifier APN in the access request, such as for example the Internet or IMS. The identifier APN determines a list of anchor servers PGW from which the access gateway AGW can choose. This connection request CSReq comprises the unique identifier of the authentication server cAAA which authenticated the user User of the terminal UE.

During a step p109, the anchor gateway PGW receives the connection request CSReq.

During a step p110, with the aid of the unique identifier of the authentication server cAAA, the anchor gateway PGW registers therewith. This registration serves, in a known manner, to signal to the authentication server cAAA the identity of the anchor gateway PGW in charge of the connection in respect of the terminal UE with the packet switching network so as to force the reselection of this same anchor gateway PGW in case of mobility of the terminal, for example between non-3GPP access and 3GPP access or vice versa. This can also serve for metering purposes among other things.

If registration is authorized by the authentication server cAAA, the anchor gateway PGW sends, during a known step p111, to the access gateway AGW, a connection response CSResp, that the latter receives during a likewise known step a111. The connection between the terminal UE and the packet switching network is then established.

Figure 5:
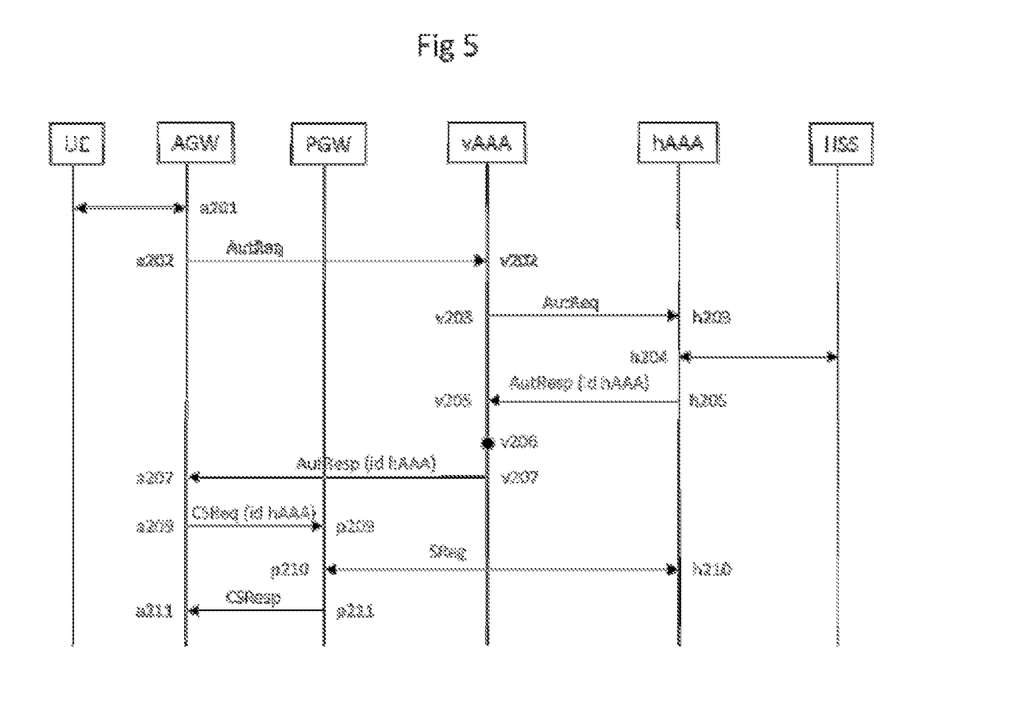
FIG. 5 presents the steps of the methods of authorization, of connection and of registration, according to the second embodiment of the invention.

FIG. 5 presents the steps of the methods of authentication, of connection and of registration, according to a second embodiment of the invention.

During a known step a201, the terminal UE of a user User attaches itself to the access gateway AGW of a visited network vN, providing for example non-3GPP access, such as WiFi, to a service of a 3GPP network such as telephone voice. During this step the user User is authenticated by an authentication server.

During a known step a202, the access gateway AGW sends an authorization request AuthReq in respect of the terminal UE, comprising an identifier UserId of the user User and the response to the authentication request dispatched by the terminal UE, to an authentication server vAAA of type AAA in the visited network vN, previously associated with the gateway AGW.

During a known step v202, the authentication server vAAA receives the authorization request AutReq.

During a known step v203, the authentication server vAAA transfers the authorization request AutReq to an authentication server hAAA situated in the home network hN of the terminal UE, which is the same server which dispatched the information necessary for the authentication of the user User during step a201.

During a known step h203, the authentication server hAAA receives the authorization request AutReq.

During a known step h204, the authentication server hAAA consults the HSS server associated therewith, and obtains the authorization parameters for the attachment of the terminal UE, which indicate in particular whether the anchor gateway PGW can be selected dynamically by the access gateway AGW and if so, whether this anchor gateway can be selected in a visited network or must be selected in the home network.

During a step h205, the authentication server hAAA sends to the authentication server vAAA an authorization response AutResp, comprising the unique identifier of the authentication server hAAA, in addition to the information known according to the earlier technique. This unique identifier makes it possible to distinguish in a unique manner a server of type AAA, or a connection to the latter.

During a step v205, the authentication server vAAA receives the authorization response AutResp.

During a step v206, the authentication server vAAA obtains an item of information relating to an obligation to allocate the anchor gateway PGW in the home network hN.

During a step v207, the authentication server vAAA transfers the authorization response AutResp to the access gateway AGW, comprising the unique identifier of the authentication server hAAA.

During a step a207, the access gateway AGW receives the authorization response AutResp.

During a step a209, the access gateway AGW sends a connection request CSReq in respect of the terminal UE to the anchor gateway PGW selected in its home network hN so as to allow the terminal access to the packet switching network requested by the user, with the aid of an identifier APN in the access request, such as for example the Internet or IMS. The identifier APN determines a list of anchor servers PGW from which the access gateway AGW can choose. This connection request CSReq comprises the unique identifier of the authentication server hAAA which authenticated the user User of the terminal UE.

During a step p209, the anchor gateway PGW receives the connection request CSReq.

During a step p210, with the aid of the unique identifier of the authentication server hAAA, the anchor gateway PGW registers therewith. This registration serves, in a known manner, to signal to the authentication server hAAA the identity of the anchor gateway PGW in charge of the connection in respect of the terminal UE with the packet switching network so as to force the reselection of this same anchor gateway PGW in case of mobility of the terminal, for example between non-3GPP access and 3GPP access or vice versa. This can also serve for metering purposes among other things.

If registration is authorized by the authentication server hAAA, the anchor gateway PGW sends, during a known step p211, to the access gateway AGW, a connection response CSResp, that the latter receives during a likewise known step a211. The connection between the terminal UE and the packet switching network is then established.

Figure 6:
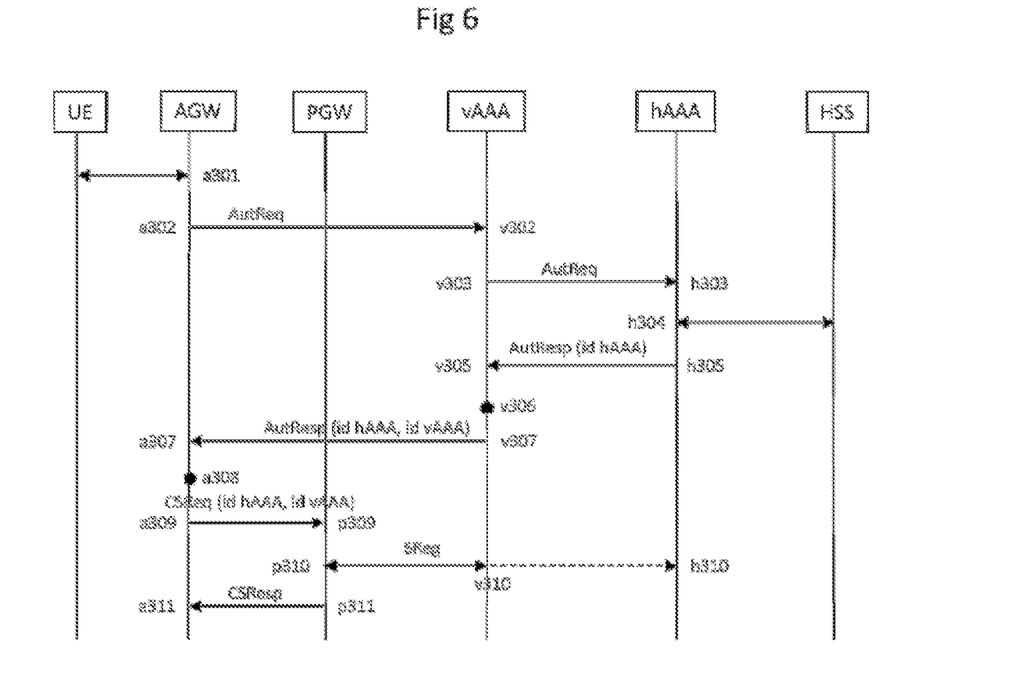
FIG. 6 presents the steps of the methods of authorization, of connection and of registration, according to the third embodiment of the invention.

FIG. 6 presents the steps of the methods of authentication, of connection and of registration, according to a third embodiment of the invention.

The steps between step a301 and step h303 as well as their chronological sequence are the same as for steps a201 to h203 described with reference to FIG. 5, and will not be described again.

During a known step h304, the authentication server hAAA consults the HSS server associated therewith, and obtains the authorization parameters for the attachment of the terminal UE, which indicate in particular whether the anchor gateway PGW can be selected dynamically by the access gateway AGW and if so, whether this anchor gateway can be selected in a visited network or must be selected in the home network.

During a step h305, the authentication server hAAA sends to the authentication server vAAA an authorization response AutResp, comprising the unique identifier of the authentication server hAAA, in addition to the information known according to the earlier technique, which can comprise an item of information relating to an authorization to allocate an anchor gateway PGW situated in the visited network vN, if the authentication server hAAA has obtained such an authorization. The unique identifier makes it possible to distinguish in a unique manner a server of type AAA, or a connection to the latter.

During a step v305, the authentication server vAAA receives the authorization response AutResp.

During a step v306, the authentication server vAAA obtains the item of information relating to the authorization to allocate an anchor gateway PGW situated in the visited network vN. It obtains it either by virtue of the explicit item of information included in the authorization response AutResp, or, when this item of information is not included in the authorization response AutResp, by another means such as by applying a policy configured by the operator of the visited network vN in the authentication server vAAA.

During a step v307, the authentication server vAAA transfers the authorization response AutResp to the access gateway AGW, comprising the unique identifier of the authentication server hAAA and the item of information relating to the authorization to allocate an anchor gateway PGW situated in the visited network vN, while adding thereto the unique identifier of the authentication server vAAA, because of the indication obtained during step v306.

During a step a307, the access gateway AGW receives the authorization response AutResp.

The presence in the authorization response AutResp of the item of information relating to the authorization to allocate an anchor gateway PGW situated in the visited network vN triggers a step a308, where the access gateway AGW therefore selects, either an anchor gateway in the visited network vN, or a predetermined anchor gateway in the home network hN of the terminal.

If the access gateway AGW does not select the anchor gateway in the visited network vN, the steps according to step a308 are the same as in the second embodiment described with reference to FIG. 5, from step a209, and will not be presented again.

Otherwise, during a step a309, the access gateway AGW sends a connection request CSReq in respect of the terminal UE to the anchor gateway PGW selected in its visited network vN so as to allow the terminal access to the packet switching network requested by the user, with the aid of an identifier APN in the access request, such as for example the Internet or IMS. The identifier APN determines a list of anchor servers PGW from which the access gateway AGW can choose. This connection request CSReq comprises the unique identifier of the authentication server hAAA which authenticated the user User of the terminal UE, as well as the unique identifier of the authentication server vAAA.

During a step p309, the anchor gateway PGW receives the connection request CSReq.

During a step p310, with the aid of the two unique identifiers of the authentication servers vAAA and hAAA, the anchor gateway PGW registers with the authentication server hAAA by routing the registration request through the authentication server vAAA. This registration serves, in a known manner, to signal at one and the same time to the authentication server hAAA and to the authentication server vAAA the identity of the anchor gateway PGW in charge of the connection in respect of the terminal UE with the packet switching network, so as to force the reselection of this same anchor gateway PGW in case of mobility of the terminal, for example between non-3GPP access and 3GPP access or vice versa. This can also serve for metering purposes among other things.

If registration is authorized by the authentication server hAAA, the anchor gateway PGW sends, during a known step p311, to the access gateway AGW, a connection response CSResp, that the latter receives during a likewise known step a311. The connection between the terminal UE and the packet switching network is then established.

Figure 7:
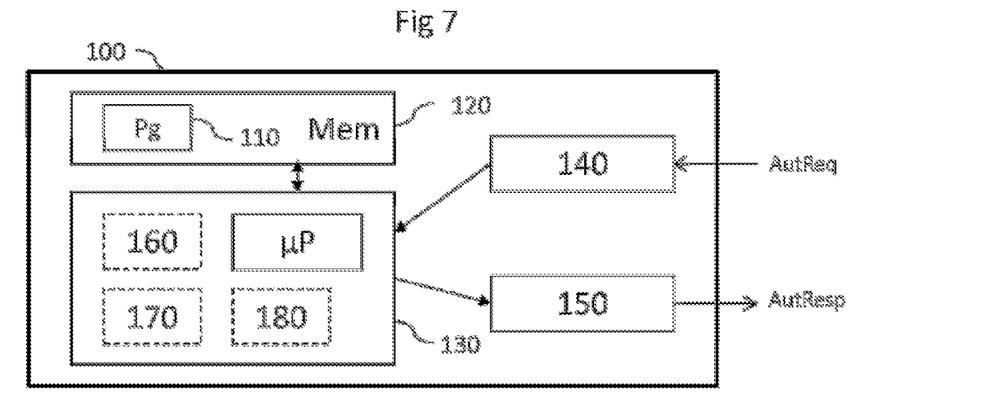
FIG. 7 presents an exemplary structure of an authorization device, according to one aspect of the invention.

In conjunction with FIG. 7, an exemplary structure of an authorization device is now presented, according to one aspect of the invention.

The authorization device 100 implements the method of authorization, various embodiments of which have just been described.

Such a device 100 can be implemented in an item of equipment specialized in authentication, authorization and metering, so-called server of type AAA, using a message exchange protocol such as Diameter. It is implemented for example in the authentication server cAAA or vAAA.

For example, the device 100 comprises a processing unit 130, equipped for example with a microprocessor µP, and driven by a computer program 110, stored in a memory 120 and implementing the method of authorization according to the invention. Upon initialization, the code instructions of the computer program 110 are for example loaded into a RAM memory, before being executed by the processor of the processing unit 130.

Such a device 100 comprises the following modules:
- reception 140 of a user authorization request AutReq originating from an access gateway AGW, comprising an identifier of the user,
- sending 150 of an authorization response AutResp destined for the access gateway AGW, comprising authorization parameters in respect of the user, and a unique identifier of an authentication server that authenticated the user cAAA or hAAA.

Advantageously, the device 100 can furthermore comprise the following modules, if the current authentication server vAAA is in a network visited by the terminal, and if the user has been authenticated by another authentication server hAAA in a home network of the terminal,
- transmission 160 of the authorization request AutReq to the other authentication server hAAA,
- obtaining 170 of an item of information relating to an authorization to allocate an anchor gateway PGW situated in the visited network and intended to connect the user terminal to the packet switching network,
- and inclusion 180 in the authorization response AutResp of a unique address of the current authentication server vAAA.

Figure 8:
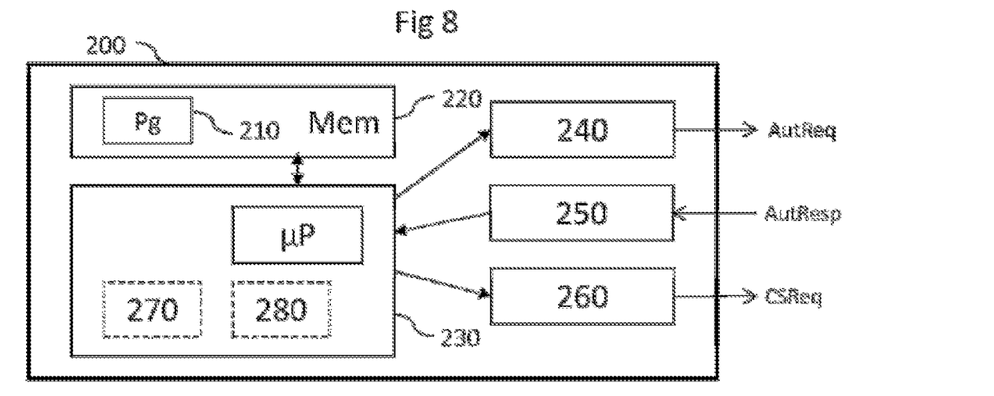
FIG. 8 presents an exemplary structure of a connection device, according to one aspect of the invention.

In conjunction with FIG. 8, an exemplary structure of a connection device is now presented, according to one aspect of the invention.

The connection device 200 implements the method of connection, various embodiments of which have just been described.

Such a device 200 can be implemented in an access gateway affording a non-3GPP user terminal access to a 3GPP network.

It is implemented for example in the gateway AGW.

For example, the device 200 comprises a processing unit 230, equipped for example with a microprocessor μP, and driven by a computer program 210, stored in a memory 220 and implementing the method of connection according to the invention. Upon initialization, the code instructions of the computer program 210 are for example loaded into a RAM memory, before being executed by the processor of the processing unit 230.

Such a device 200 comprises the following modules:
- sending 240 of a user authorization request AutReq comprising an identifier of the user, destined for a current authentication server cAAA or vAAA,
- reception 250 of an authorization response AutResp originating from the current authentication server cAAA or vAAA, comprising a unique identifier of the authentication server cAAA or hAAA that authenticated the user,
- sending 260 of a connection request CSReq to the anchor gateway PGW, intended to connect the terminal UE to the packet switching network, comprising the unique identifier of the authentication server cAAA or hAAA that authenticated the user.

Advantageously, the device 200 can furthermore comprise the following modules, if the current authentication server vAAA is in a network visited by the terminal, and if the user has been authenticated by another authentication server hAAA in a home network of the terminal,
- if an authorization parameter relating to the selection of an anchor gateway in a network visited by the terminal is received in the authorization response AutResp, selection 270 between the anchor gateway PGW in the network visited by the terminal or the anchor gateway PGW in the home network of the terminal,
- if the anchor gateway PGW is selected in the visited network, inclusion 280 in the authorization response AutResp of a unique address of the current authentication server vAAA.

Figure 9:
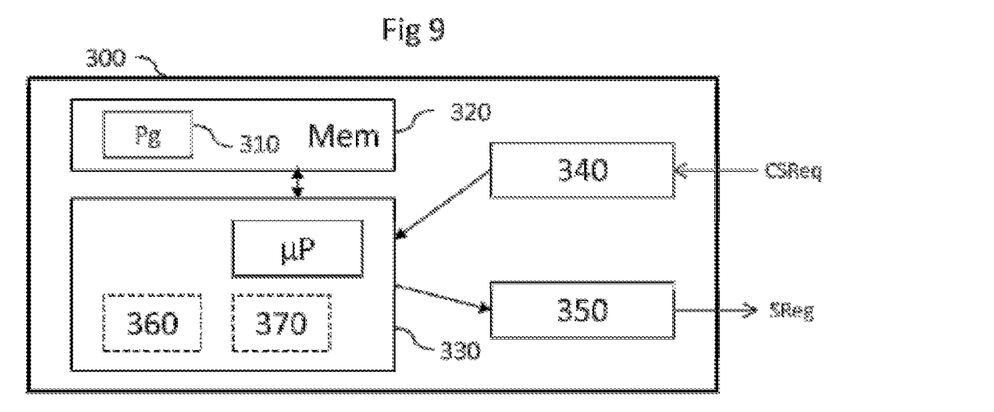
FIG. 9 presents an exemplary structure of a registration device, according to one aspect of the invention.

In conjunction with FIG. 9, an exemplary structure of a registration device is now presented, according to one aspect of the invention.

The registration device 300 implements the method of registration, various embodiments of which have just been described.

Such a device 300 can be implemented in an anchor gateway affording a 3GPP network access to a packet switching network.

It is implemented for example in the gateway PGW.

For example, the device 300 comprises a processing unit 330, equipped for example with a microprocessor μP, and driven by a computer program 310, stored in a memory 320 and implementing the method of registration according to the invention. Upon initialization, the code instructions of the computer program 310 are for example loaded into a RAM memory, before being executed by the processor of the processing unit 330.

Such a device 300 comprises the following modules:
- reception 340 of a connection request CSReq in respect of the terminal, originating from an access gateway AGW to which the terminal is attached, comprising a unique identifier of the authentication server cAAA or hAAA that previously authenticated the user,
- sending 350 of a registration request SReg to the authentication server cAAA or hAAA that previously authenticated the user.

Advantageously, the device 300 can furthermore comprise the following modules, if the current authentication server vAAA is in a network visited by the terminal, and if the user has been authenticated by another authentication server hAAA in a home network of the terminal, and if the anchor gateway PGW is in the visited network,
- obtaining 360 in the authorization response AutResp of a unique address of the current authentication server vAAA,
- routing 370 of the registration request sent SReg through the current authentication server vAAA.

The modules described in conjunction with FIGS. 7, 8 and 9 can be hardware modules or software modules.

Although the present disclosure has been described with reference to one or more examples, workers skilled in the art will recognize that changes may be made in form and detail without departing from the scope of the disclosure and/or the appended claims.

The invention claimed is:

1. A method for authorizing an authenticated user of a communications terminal, the terminal being configured to connect to a packet switching network via an access gateway to which the terminal is attached in a current network, the method being implemented by a current authentication server in the current network and comprising the following acts:
 - receiving a user authorization request originating from the access gateway, comprising an identifier of the user,
 - sending a user authorization response destined for the access gateway, comprising authorization parameters in respect of the user and a unique identifier of another authentication server that authenticated the user, other than the current authentication server, the current authentication server being in a visited network which is visited by the terminal and the other authentication server that authenticated the user being in a home network of the terminal.

2. The method of authorization as claimed in claim 1, wherein the user authorization request received is transmitted to the other authentication server.

3. The method of authorization as claimed in claim 2, wherein the method further comprises obtaining an item of information relating to an authorization to allocate an anchor gateway situated in the visited network and intended to connect the user terminal to the packet switching network, and wherein the user authorization response also comprises a unique address of the current authentication server.

4. The method of authorization as claimed in claim 1, wherein the authentication server identifier uses a format from among the following: an IP address perhaps combined with a port number if several ports are present at this IP address, an FQDN-type network name.

5. A device for authorizing an authenticated user of a communications terminal, the terminal being configured to connect to a packet switching network through an access gateway to which the terminal is attached in a current network, the device being implemented by a current authentication server in the current network and comprising:
   a processor; and
   a non-transitory computer-readable medium storing instructions, which when executed by the processor configure the device to perform acts comprising:
   receiving a user authorization request originating from the access gateway, comprising an identifier of the user,
   sending a user authorization response destined for the access gateway, comprising authorization parameters in respect of the user, and a unique identifier of an authentication server that authenticated the user,
   and, if the current authentication server is in a visited network which is visited by the terminal, and if the user has been authenticated by another authentication server in a home network of the terminal, the following act:
      transmitting the authorization request to the other authentication server.

6. The device of claim 5, wherein, if the current authentication server is in a visited network which is visited by the terminal, and if the user has been authenticated by another authentication server in a home network of the terminal, the execution of the instructions configures the device to perform the following acts:
   obtaining an item of information relating to an authorization to allocate an anchor gateway situated in the visited network and intended to connect the user terminal to the packet switching network; and
   including in the user authorization response a unique address of the current authentication server.

7. A system for identifying authentication servers comprising:
   an authorization device for authorizing an authenticated user of a communications terminal, the terminal being configured to connect to a packet switching network through an access gateway to which the terminal is attached in a current network, the authorization device being implemented by a current authentication server in the current network and comprising:
   a processor; and
   a non-transitory computer-readable medium storing instructions, which when executed by the processor configure the authorization device to perform acts comprising:
      receiving a user authorization request originating from the access gateway, comprising an identifier of the user,
      sending a user authorization response destined for the access gateway, comprising authorization parameters in respect of the user, and a unique identifier of an authentication server that authenticated the user,
   and, if the current authentication server is in a visited network which is visited by the terminal, and if the user has been authenticated by another authentication server in a home network of the terminal, the following act:
      transmitting the authorization request to the other authentication server;
   a connection device for connecting the terminal of the user to an anchor gateway connected to the packet switching network, being implemented by the access gateway to which the terminal is attached and comprising:
      a processor; and
      a non-transitory computer-readable medium storing instructions, which when executed by the processor configure the connection device to perform acts comprising:
      sending the user authorization request comprising the identifier of the user, destined for the current authentication server,
      receiving the user authorization response originating from the current authentication server, comprising the unique identifier of the authentication server that authenticated the user,
      sending a connection request to the anchor gateway, to connect the terminal to the packet switching network, comprising the unique identifier of the authentication server that authenticated the user; and
   a registration device for registering the anchor gateway and comprising:
      a processor; and
      a non-transitory computer-readable medium storing instructions, which when executed by the processor configure the registration device to perform acts comprising:
      receiving the connection request in respect of the terminal, originating from the access gateway to which the terminal is attached, comprising the unique identifier of the authentication server that previously authenticated the user,
      sending a registration request to the authentication server that previously authenticated the user.

8. The system of claim 7, wherein, if the current authentication server is in a visited network which is visited by the terminal, and if the user has been authenticated by another authentication server in a home network of the terminal, the execution of the instructions stored in the non-transitory computer-readable medium of the authorization device configures the authorization device to perform the following acts:
   obtaining an item of information relating to an authorization to allocate an anchor gateway situated in the visited network and intended to connect the user terminal to the packet switching network, and
   including in the user authorization response a unique address of the current authentication server.

9. A non-transitory computer-readable medium comprising a computer program stored thereon, which comprises instructions for implementing a method of authorizing an authenticated user of a communications terminal, when the instructions are executed by a processor of a current authentication server in a current network, method, the terminal being configured to connect to a packet switching network via an access gateway to which the terminal is attached in the current network, the method comprising the following acts:

receiving a user authorization request originating from the access gateway, comprising an identifier of the user, and sending a user authorization response destined for the access gateway, comprising authorization parameters in respect of the user and a unique identifier of another authentication server that authenticated the user, other than the current authentication server, the current authentication server being in a visited network which is visited by the terminal and the other authentication server that authenticated the user being in a home network of the terminal.

* * * * *